United States Patent
Valbh et al.

(10) Patent No.: US 7,015,432 B2
(45) Date of Patent: Mar. 21, 2006

(54) WATER HEATER CONTROL SYSTEM AND METHOD FOR CONTROLLING TEMPERATURE WITH SAME

(75) Inventors: Anil I Valbh, Orlando, FL (US); Kiran C Chhaganlal, Winter Springs, FL (US)

(73) Assignee: Avista Technologies, LLC, Orlando, FL (US)

( * ) Notice: Subject to any disclaimer, the term of this patent is extended or adjusted under 35 U.S.C. 154(b) by 0 days.

(21) Appl. No.: 10/861,652

(22) Filed: Jun. 5, 2004

(65) Prior Publication Data

US 2005/0268865 A1 Dec. 8, 2005

(51) Int. Cl.
*H05B 1/02* (2006.01)
(52) U.S. Cl. .................. 219/486; 219/492; 307/38; 392/463
(58) Field of Classification Search .............. 219/492, 219/483, 485, 486, 494, 497, 441; 392/463, 392/454; 307/38–41
See application file for complete search history.

(56) References Cited

U.S. PATENT DOCUMENTS

| | | | | |
|---|---|---|---|---|
| 4,333,002 A | * | 6/1982 | Kozak | 392/451 |
| 6,080,971 A | * | 6/2000 | Seitz et al. | 219/483 |
| 6,363,216 B1 | * | 3/2002 | Bradenbaugh | 392/463 |
| 2002/0030048 A1 | * | 3/2002 | Ziaimehr et al. | 219/486 |

* cited by examiner

*Primary Examiner*—Mark Paschall
(74) *Attorney, Agent, or Firm*—Michael L. Leetzow, P.A.

(57) ABSTRACT

A water heater control system is disclosed that can be programmed by a user to go on and off at predetermined times and maintain temperatures below normal usage temperatures. The water heater control system may also program itself based on usage of the hot water by users. The control system may also be remotely controlled, using a computer, wireless communication, or other communication device. The water heater control system may be included with a new water heater or used to replace existing control systems.

15 Claims, 5 Drawing Sheets

WATER HEATER CONTROL SYSTEM AND METHOD FOR CONTROLLING TEMPERATURE WITH SAME

The present invention relates to a water heater control system that can be programmed to maintain a certain water temperature, and more particularly, a water heater control system that can monitor the water usage and control temperature cycles of the water heater based on prior usage.

There are a number of prior art water heater control systems. However, the majority of these systems are generally inefficient and are really time clocks or timers to turn the water heaters on and off at predetermined times during the day. However, such systems are generally inefficient and use an excessive amount of energy.

Accordingly, the present invention is directed to a water heater control system and method of use that substantially obviates one or more of the problems and disadvantages in the prior art. Additional features and advantages of the invention will be set forth in the description that follows, and in part will be apparent from the description, or may be learned by practice of the invention. The objectives and other advantages of the invention will be realized and attained by the apparatus and process particularly pointed out in the written description and claims, as well as the appended drawings.

SUMMARY OF THE INVENTION

To achieve these and other advantages and in accordance with the purpose of the invention as embodied and broadly described herein, the invention is directed to a water heater control system for a water heater including a controller, at least one relay electrically connected to the controller, at least one thermal sensor electrically connected to the controller to monitor water temperature in the water heater, at least one heating element connected to the at least one relay, the at least one heating element capable of heating water in the water heater to a first predetermined temperature wherein the controller maintains the water temperature between the first predetermined temperature and a second predetermined temperature, the second predetermined temperature being higher than an ambient temperature and lower than the first predetermined temperature.

In yet another aspect, the invention is directed to a method for controlling water temperature in a water heater including heating water in the water heater to a first predetermined water temperature, monitoring the water temperature in the water heater at at least one location, energizing at least one heating element to raise the water temperature in the water heater to the first predetermined temperature when the water temperature at the at least one location falls below a second predetermined water temperature.

It is to be understood that the foregoing general description and the following detailed description are exemplary and explanatory and are intended to provide further explanation of the invention as claimed.

The accompanying drawings are included to provide a further understanding of the invention and are incorporated in and constitute a part of the specification. The drawings illustrate several embodiments of the invention and together with the description serve to explain the principles of the invention.

DETAILED DESCRIPTION OF THE INVENTION

Figure 1:
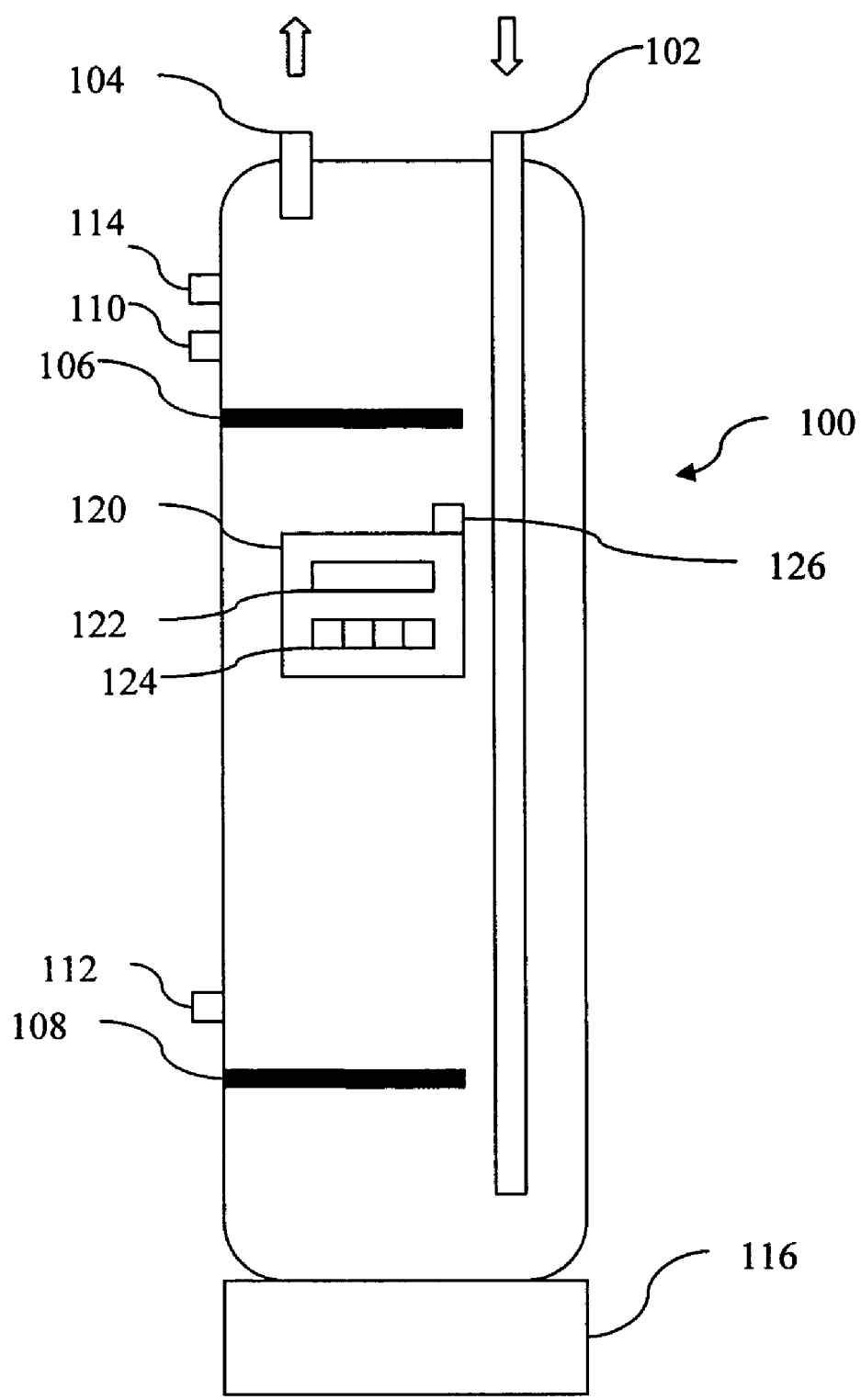
FIG. 1 is a diagrammatic representation of a water heater according to the present invention.

A water heater 100 according the present invention is illustrated in FIG. 1. The water heater 100 has a cold water inlet 102 and a hot water outlet 104, with appropriate arrows indicating the water flow from each. If the water heater 100 is a dual element water heater, then the water heater 100 has an upper heating element 106 and a lower heating element 108. The dual element water heater will also have an upper thermostat 110 and a lower thermostat 112. Typically a high temperature cutoff 114 will also be present. If the water heater 100 is a single element water heater, then it typically has only a lower heating element 108 and lower thermostat 112. The water heater also has relays (not shown) that are associated with each of the heating elements. If the water heater 100 is a gas-fired water heater, then it will have a burner 116 located on the bottom of the water heater 100 to heat the water in response to signals from the lower thermostat 112.

On dual element water heaters, the upper thermostat 110 typically controls the overall water temperature of the water heater 100. After water is initially heated to a first predetermined temperature and the water at the top of the water heater 100 cools to a second predetermined temperature, the upper thermostat 110 causes the upper heating element 106 to heat the water until it reaches a first predetermined temperature. The first predetermined temperature is lower than the maximum temperature of the water heater. The thermostat 110 then causes the power to be removed from the upper heating element 106. When the power is removed from the upper thermostat, it is applied to the lower thermostat 112. The lower thermostat 112 controls the lower heating element 108 in a similar manner. If the lower thermostat 112 is set at a temperature that is slightly above the upper thermostat 110, then the water heater 100 will maintain an even temperature since water will expand as it is heated and rises.

The water heater 100 according to the present invention also includes a control system 120. While the control system is illustrated in FIG. 1 as being located on the water heater 100, it should be noted that it may also be located on a wall or other structure near the water heater 100. The control system 120 has a readout 122 to enable a user to follow directions, monitor the operation of the control system 120 and the water heater, and to observe input during operation of the buttons 124. The buttons 124 could be actual buttons, touch screen inputs, toggle switches, rocker switches, or any other type of switches that allows the user to input appropriate data as necessary and as indicated below. Additionally, while four buttons 124 are illustrated on the control system 120, there could be more or fewer. Also, the buttons 124 may be integrated with the readout 122. The readout 122 may be an LCD screen, and LED screen or any other appropriate type of readout to allow the operator to use and monitor the function of the control system 120. The control system 120 may also have an port 126 that allows for connection with a computer or a communication device to allow the control system to be monitored and operated remotely. The port 126 may be an RS-232, a USB, or a wireless port to allow communication with control system 120. The control system 120 also has an internal clock to track the current time and date.

Generally, the control system 120 controls the water temperature to maintain an acceptable range of water temperatures during those periods of the day when the use of hot water is most needed. There may be only one or several times during the day when this would occur. For example, the users may need hot water between 8 a.m. and 4 p.m. on weekends or between 6 and 8 a.m. for the morning routines and then again between 5 and 9 p.m. for nightly routines during the week. There may also be different times of the day for different weekdays and even on the weekends. The user may also program in a schedule for holidays or vacation times as well. For the other times of the day (when hot water is not needed), the water may cool down to a lower temperature in order to save energy, but preferably not to an ambient temperature. For example, the users may want the water temperature to stay between 130° F. and 120° F. during the high usage time and then allow the water to cool to between 100° F. and 90° F. the remainder of the day and/or night.

Figure 2:
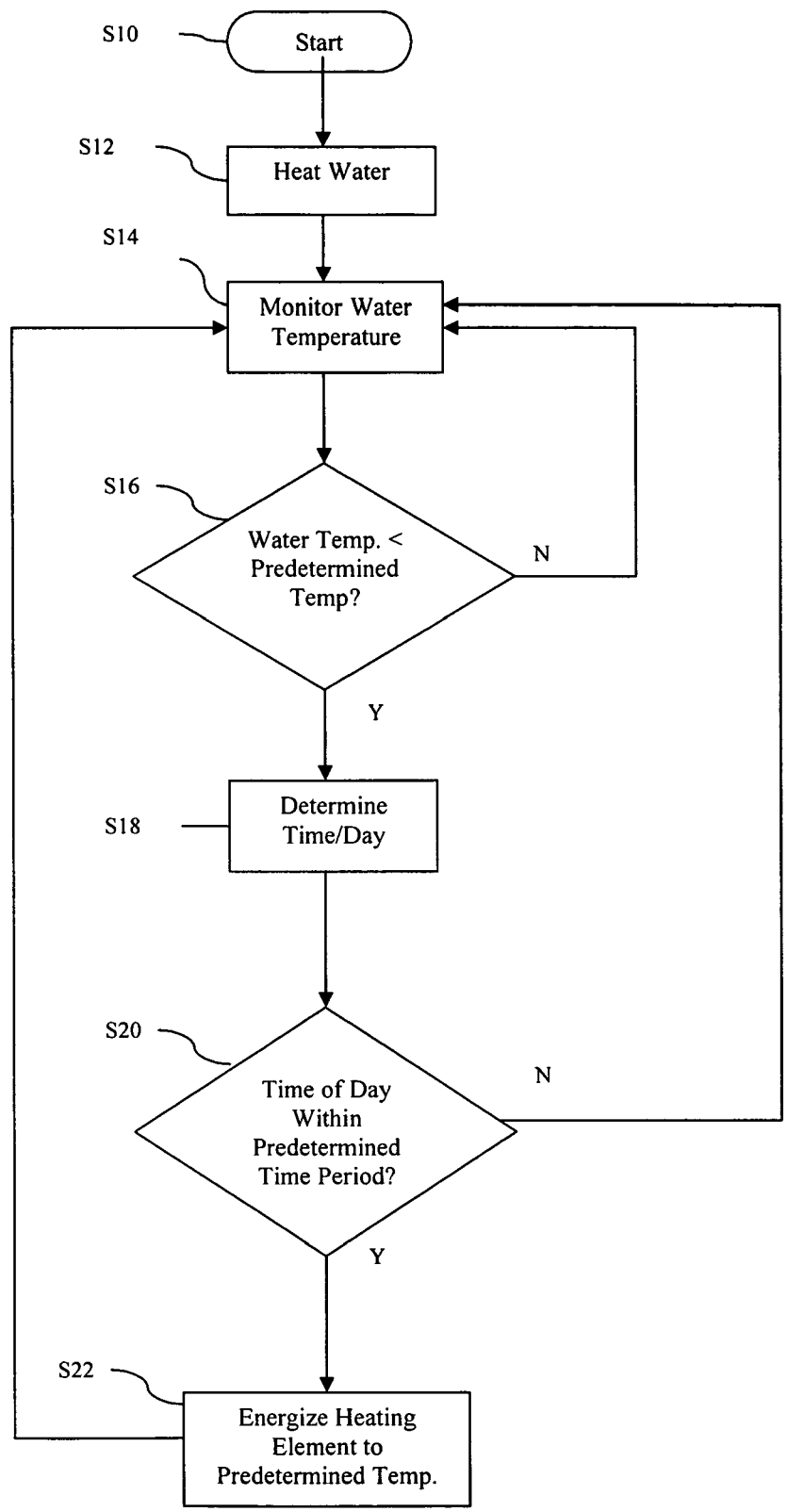
FIG. 2 is a flow diagram illustrating one embodiment of a method for the controlling water temperature in a water heater according to the present invention.

The operation of the control system 120 according to a first embodiment to control the temperature of water in the water heater 100 will now be described in reference to FIG. 2. When the control system 120 and water heater 100 is started at step S10, the water may be colder than desired. The water in the water heater 100 is heated, preferably to a first predetermined temperature (130° F. in the example above), at step S12. The first predetermined temperature is typically a lower than the water heater's maximum or cut off temperature. The control system 120 monitors the water temperature in the water heater with the thermal sensors 112/114 (one or both, depending on the system) at step S14. The control system 120 determines if the water temperature falls below a predetermined temperature, which is typically a second predetermined temperature (120° F. in the example above), at step S16. If the water temperature has not fallen below the (second) predetermined temperature, the control system 120 returns to step S14 and continues to monitor the water temperature. If, however, the water temperature falls below the second predetermined temperature (120° F. in the example above) at step S16, the control system 120 determines the current day and the current time of day at step S18. The control system 120 then compares the current day from step S18 against a predetermined day and time to determine if the current water temperature is correct given the current day and time at step S20. In the above example, if the time of day is between 8 a.m. and 4 p.m., then the control system 120 determines that it is within a predetermined time period, and the control system 120 at step S22 causes the heating elements 106 and/or 108 or 116, depending on the water heater type, to energize and heat the water to the first predetermined water temperature. If the time of day (and the day) is not within the predetermined time period, then the control system returns to step S14 to monitor the water temperature and the time of day at steps S18 & S20 until the time of day is within the predetermined time period.

The water heater 100 with system controller 120 may also have a manual override button that allows the user to operate and heat the water outside the predetermined time period. The manual override button would preferably allow the water heater to heat the water for a variety of times, including for example a half hour, one hour, and two hours.

Figure 3:
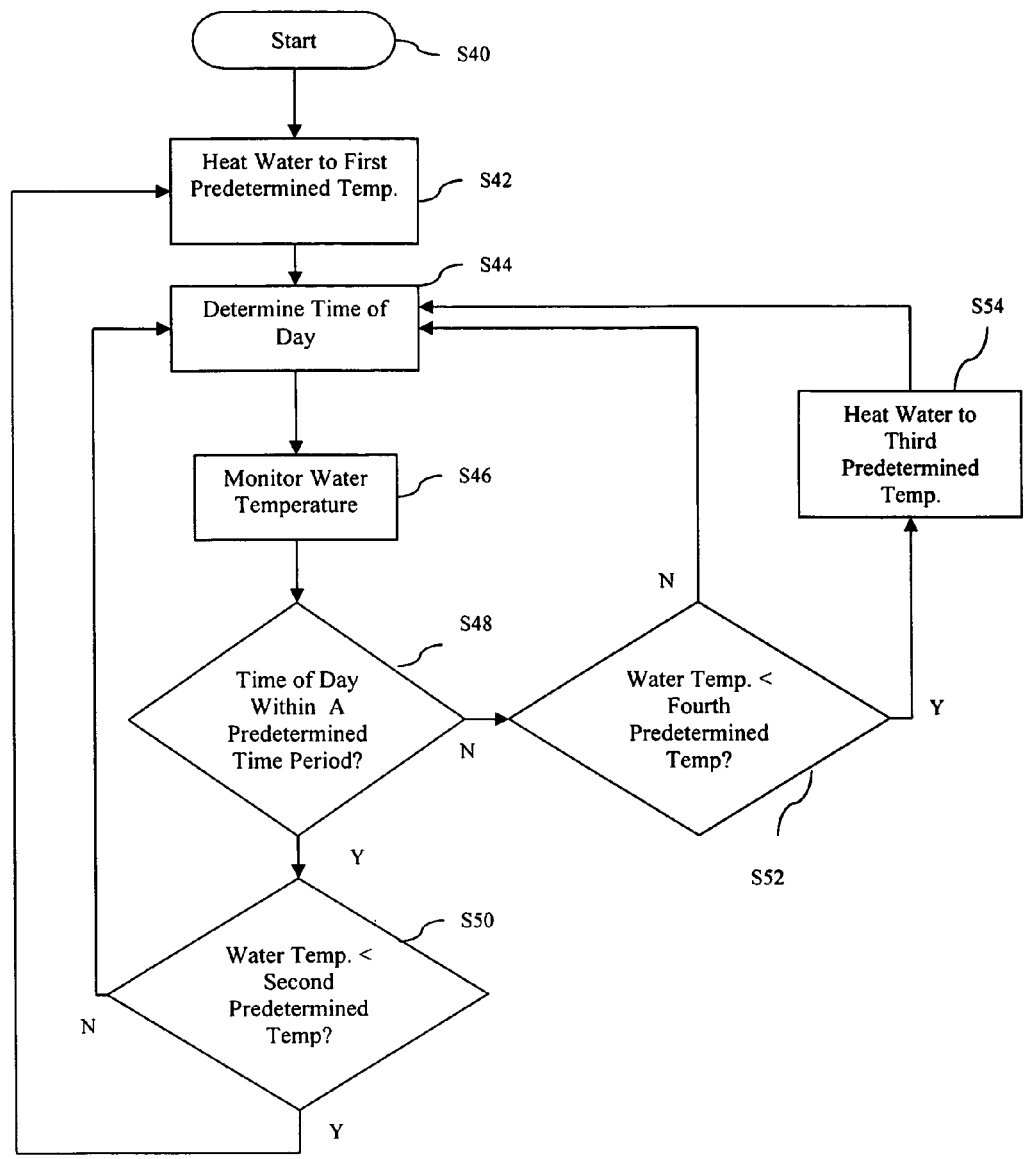
FIG. 3 is a flow diagram of another embodiment of a method for controlling the water temperature in a water heater according to the present invention.

Another embodiment of controlling the water temperature in a water heater according to the present invention is illustrated in FIG. 3. In this embodiment, the system controller 120 generally keeps the water temperature within one of two temperature ranges. The first temperature range is similar to that in the first embodiment, i.e., a temperature range in which the water temperature is typically used. The second temperature range is a reduced temperature range, keeping the water temperature generally above an ambient temperature and capable of being heated to the first predetermined range within a shorter period of time and with less energy than if the water temperature were allowed to go to an ambient temperature. As illustrated in FIG. 3, step S40 starts the process and then at step S42, the water is heated to a first predetermined water temperature. Typically, the process starts by heating the water to the maximum temperature set by the user (first predetermined temperature), although another temperature could be used instead (i.e., the third predetermined temperature as described below). The system controller 120 then determines the day and the time of day at step S44. At step S46, the system controller 120 monitors the temperature of the water in water heater 100. If the system is with in a predetermined time period (i.e., a time wherein the water temperature should be maintained in a first temperature range for use), which is determined at step S48, then the system controller 120 moves to step S50. At step S50, the system controller 120 determines if the water temperature has fallen below the baseline temperature for that usable range—the second predetermined temperature. In the example above, the second predetermined temperature is 120° F. If the temperature has fallen below that temperature, the system controller 120 returns to step S42, where the water temperature is heated back to the first predetermined temperature (130° F. in the example given above).

However, if the time of day is not within a predetermined time period at step S48, then the system controller 120 determines if the water temperature has fallen below a fourth predetermined temperature in step S52. The fourth predetermined temperature is preferably the lowest temperature the water should be for the users, which was 90° F. in the example above. If the water temperature is still above the fourth temperature, then the system controller 120 returns to step S42, where it continues to monitor the water heater. However, if the water temperature has fallen below the fourth predetermined temperature at step S52, then the system controller causes the heating elements to heat the water to the third predetermined temperature at step S54, which is the upper limit of the second range of temperatures and was 100° F. in the above example. After the water is heated to the third predetermined temperature, the system controller 120 returns to step S44 to monitor the water heater.

Figure 4:
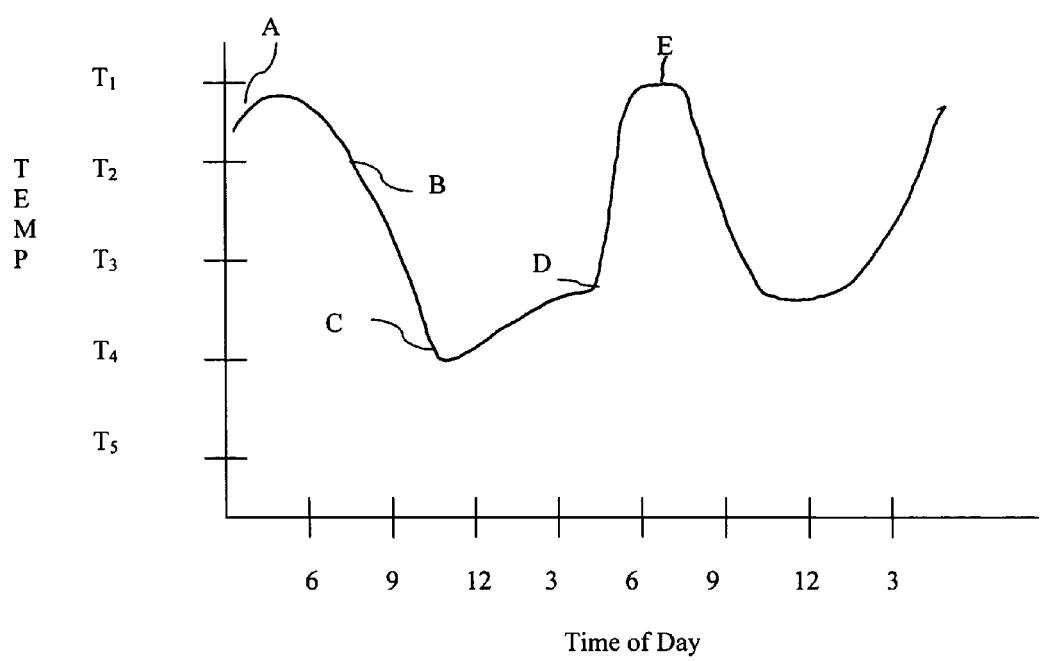
FIG. 4 is a graphical representation of the water temperature in a controlled the water heater according to the present invention.

An example of the temperature cycle of this embodiment is illustrated graphically in FIG. 4. In the example illustrated in FIG. 4, it is assumed that the fourth predetermined is above an ambient temperature, which is depicted as $T_5$ in the figure. However, the fourth predetermined temperature need not be above an ambient temperature. For FIG. 4, the time periods for usage are as indicated above in the example—between 6 and 8 a.m. and again between 4 and 8 p.m. At point A, the water heater has heated the water to the first predetermined temperature and is ready for usage. At point B, the water temperature is passing below the second predetermined temperature, but the time is outside the predetermined time period, so the water heater does not heat the water. At point C, the temperature falls below the fourth predetermined temperature, so the water heater energizes the heating elements to heat the water to get it back up towards the third predetermined temperature. However, at point D, the time is within the afternoon predetermined time period and the water heat heats the water temperature back to the first predetermined temperature at point E.

The specific temperatures for the first through fourth predetermined temperatures may be changed and still be within the scope of the present invention. Additionally, while the time that the temperature of the water is maintained between the first and second predetermined temperatures is indicated to be a predetermined time period, it may be referred to as a first predetermined time period and the time period when the temperature is maintained between the third and fourth predetermined temperatures may be referred to as a second time period. The system controller 120 would then determine if the time of day is within the first or second predetermined time period and maintain the water temperature appropriately.

It should be noted that the user or installer would appropriately program the system controller 120 to input the correct day and time of day, as well as each of the predetermined temperatures. The system controller 120 preferably has a calendar programmed into its memory with typical holidays for the country in which it is installed, so that the user may program in a holiday schedule as well. Similarly, the system controller 120 would have a vacation mode, where the system controller 120 would maintain the water temperatures differently. For example, as illustrated in FIG. 2, the system controller 120 may keep the night time water temperature to be above a certain temperature and during the day, allow the water temperature to return to an ambient temperature. This is particularly useful in the northern climates during the winter time if the users are on vacation. The water heater would ensure that the water does not freeze during the evening when it may be the coldest part of the day.

Figure 5:
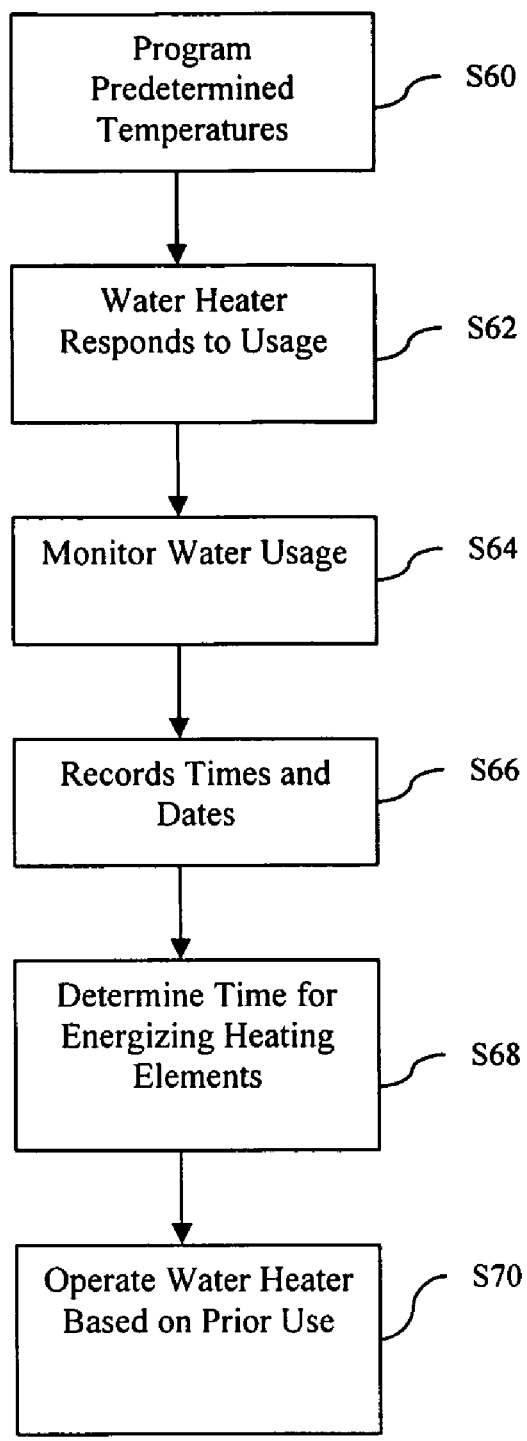
FIG. 5 is a flow diagram of another embodiment of a method for controlling the water temperature in a water heater according to the present invention.

The system controller 120 may also be programmed to monitor the usage of the water and determine the best times for each of the predetermined time periods. For example, as illustrated in FIG. 5, the water heater 100 may begin as a regularly operating water heater. The user would program in the predetermined temperatures (at least the first and second predetermined water temperatures, but the user may also program the third and fourth predetermined temperatures as well) at step S60. The water heater would then operate as a typical hot water heater by heating the water as needed by the users at step S62. The system controller 120 monitors the usage of the hot water heater in step S64. The system controller records at step S66 the times that the water heater is used for a certain period of time. In the preferred embodiment, the system controller 120 records for at least two weeks, but it may be longer for a more accurate assessment or a shorter period of time if preferred. While there may be a variety of ways of determining usage rather than simply heat loss from extended periods of non-use, the system controller 120 preferably only records dates/days/times when the temperature of the water changes by a predetermined amount (e.g., 5 degrees) for a predetermined period of time (e.g., 10 minutes), although other changes temperatures and time periods are acceptable for the present invention. Based on the recorded information at step S66, the system controller 120 will determine at step S68 the predetermined time periods (i.e., the times for energizing the heating elements to keep the water temperature between the first and second predetermined temperatures). Then at step S70, the system controller 120 will heat the water based on the determined times. The system controller 120 preferably monitors the water usage and updates the predetermined time periods based on the newly acquired data.

The system controller 120 may be included with either a new water heater, or may be provided as a kit to replace the existing control system. As indicated above, the system controller 120 may be attached to the water heater or to structure near the water heater. The kit may be installed by the user, or more preferably, an electrician due to nature of the present invention.

It will be apparent to those skilled in the art that various modifications and variations can be made in the water heater controller of the present invention without departing from the spirit or scope of the invention. Thus, it is intended that the present invention cover the modifications and variations of this invention provided they come within the scope of the appended claims and their equivalents.

We claim:

1. A water heater control system for a water heater comprising:
    a system controller;
    at least one relay electrically connected to the system controller;
    at least one thermal sensor electrically connected to the system controller to monitor water temperature in the water heater;
    at least one heating element electrically connected to the at least one relay, the at least one heating element capable of heating water in the water heater to a first predetermined temperature,
    wherein the system controller maintains the water temperature between the first predetermined temperature and a second predetermined temperature during at least one predetermined time of day, the predetermined time of day being determined by the system controller based on water use from the water heater, the second predetermined temperature being higher than an ambient temperature and lower than the first predetermined temperature.

2. The water heater control system of claim 1, wherein the system controller is programmable.

3. The water heater control system of claim 2, wherein a user may program at least two temperature cycles into the system controller.

4. The water heater control system of claim 1, wherein the controller has a visual display.

5. The water heater control system of claim 1, wherein the system controller may be remotely programmed.

6. A method for controlling water temperature in a water heater comprising the steps of:
    heating water in the water heater to a first predetermined water temperature;
    monitoring the water temperature in the water heater at at least one location;
    determining a time of day; and
    energizing at least one heating element to raise the water temperature in the water heater to the first predetermined temperature when the water temperature at the at least one location falls below a second predetermined water temperature only when the time of day is within at least one predetermined time period.

7. The method for controlling water temperature in a water heater according to claim 6, wherein the second predetermined water temperature is above an ambient temperature.

8. The method for controlling water temperature in a water heater according to claim 6, wherein the at least one predetermined time period is programmed by a user.

9. The method for controlling water temperature in a water heater according to claim 6, wherein the at least one predetermined time period is based on use of hot water from the water heater and determined by a controller associated with the water heater.

10. The method for controlling water temperature in a water heater according to claim 6, further comprising the step of:
   energizing the at least one heating element to raise the water temperature to a third predetermined temperature after the water temperature falls below a fourth predetermined temperature when the time of day is not within the at least one predetermined time period.

11. The method for controlling water temperature in a water heater according to claim 10, wherein the third predetermined temperature is lower than the second predetermined temperature and higher than the fourth predetermined temperature.

12. The method for controlling water temperature in a water heater according to claim 10, wherein the at least one predetermined time period is based on use of hot water from the water heater and determined by a controller associated with the water heater.

13. The method for controlling water temperature in a water heater according to claim 10, wherein the at least one predetermined time period comprises at least two predetermined time periods in a single 24 hour period.

14. The method for controlling water temperature in a water heater according to claim 13, wherein the at least two predetermined time periods are of different durations.

15. The method for controlling water temperature in a water heater according to claim 6, wherein the at least one predetermined time period is less than 6 hours long.

* * * * *